United States Patent
Polding

[11] Patent Number: 6,073,590
[45] Date of Patent: Jun. 13, 2000

[54] DOG LEASH WITH BAG CONTAINER

[75] Inventor: Janet Marie Armstrong Polding, Guelph, Canada

[73] Assignee: The Polding Partners Inc., Guelph, Canada

[21] Appl. No.: 09/233,676

[22] Filed: Jan. 12, 1999

[30] Foreign Application Priority Data

May 13, 1998 [CA] Canada ................................ 2237462

[51] Int. Cl.[7] .................................................. A01K 27/00
[52] U.S. Cl. .............................. 119/795; 119/858; 294/1.3
[58] Field of Search ................................... 119/792, 793, 119/794, 795, 797, 858, 867, 174; 294/1.3, 1.4, 1.5

[56] References Cited

U.S. PATENT DOCUMENTS

| | | | |
|---|---|---|---|
| 4,252,356 | 2/1981 | Tokuzumi | 294/1.3 |
| 5,131,704 | 7/1992 | Li | 294/1.4 |
| 5,184,762 | 2/1993 | Nevitt | 119/858 |
| 5,363,809 | 11/1994 | Roe | 119/792 |
| 5,441,017 | 8/1995 | Lindsay | 119/795 |
| 5,560,321 | 10/1996 | Hess | 119/858 |
| 5,718,192 | 2/1998 | Sebastian | 119/795 |
| 5,727,500 | 3/1998 | Conboy | 119/174 |
| 5,826,547 | 10/1998 | Gajewska | 119/795 |

FOREIGN PATENT DOCUMENTS 2 314 258  12/1997  United Kingdom ............ A45C 11/00

Primary Examiner—Peter M. Poon
Assistant Examiner—Elizabeth Shaw
Attorney, Agent, or Firm—Anthony Asquith & Co.

[57] ABSTRACT

A dog leash is equipped with a container, for containing a supply of plastic grocery bags, for collecting pet excrement. The container is stitched to the leash just below the hand-loop of the leash. The container is of light-weight fabric or material, and takes its structure from being stitched to the leash, lengthwise along the container. The open mouth of the container is wrapped around the leash and secured with Velcro.

8 Claims, 4 Drawing Sheets

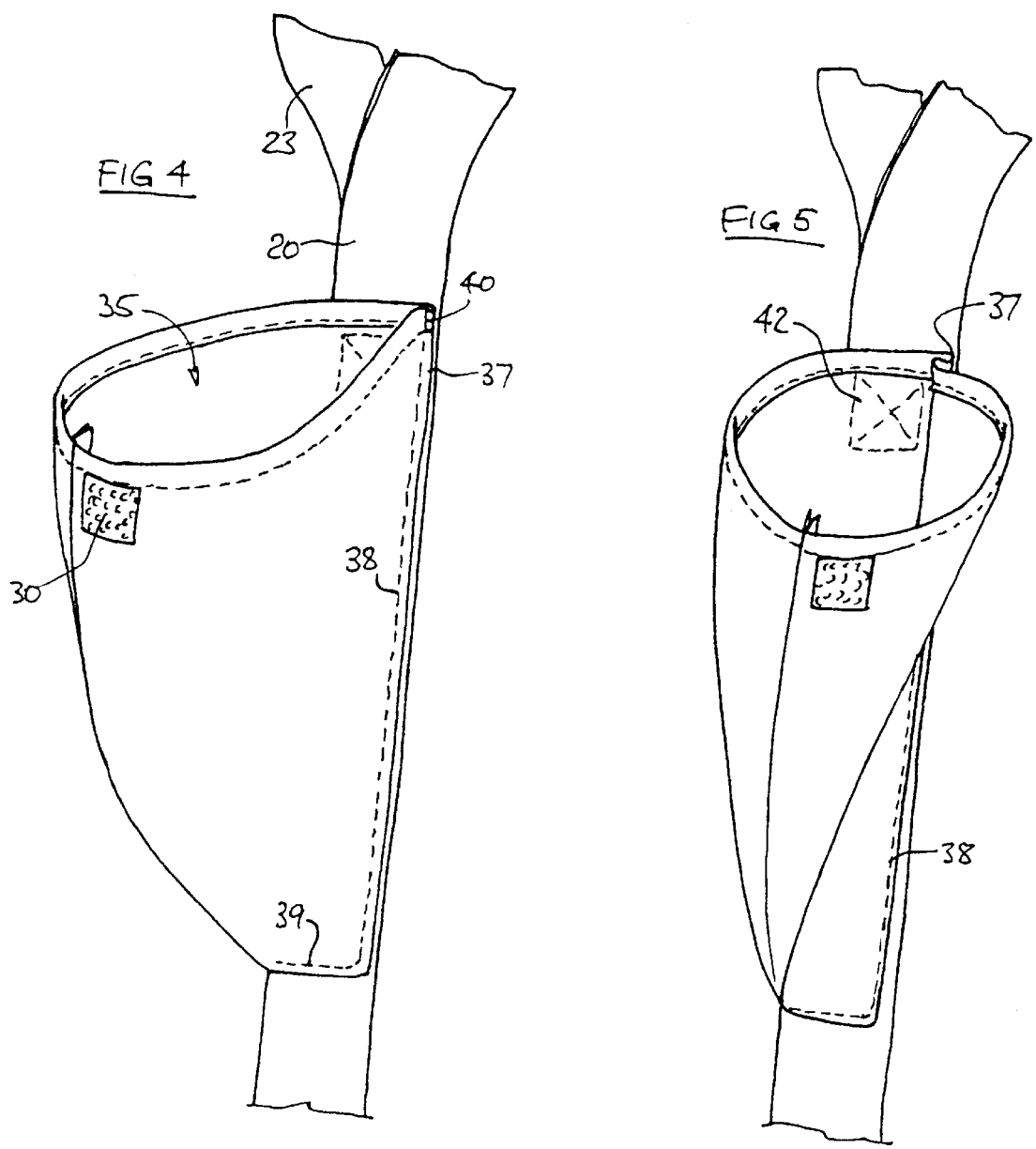

DOG LEASH WITH BAG CONTAINER

This invention relates to a dog leash, and relates to providing a means for carrying a bag or bags (for example, plastic grocery bags) for receiving and containing excrement that the dog might produce while being walked.

BACKGROUND TO THE INVENTION

Picking up excrement from pet dogs has become mandatory in some jurisdictions, and is a clearly desirable thing to do even where not mandated. But many dog-owners, no matter how civic-minded, are uncomfortable with the task of picking up the excrement.

The present invention aims to simplify some of the preparations for the task of picking up the excrement. With the invention, at least some aspects of a distasteful task can be made simpler.

It is generally observed that, while walking their dogs, dog owners often use some form of plastic bag to collect pet waste. Typically, the plastic bag is a used grocery bag, which is advantageous in that the grocery bags are thereby recycled. With the excrement contained in the grocery bag, the bag can be readily disposed of, by placing the bag in the nearest waste receptacle.

It is also observed that most pet owners either stuff the pockets of their clothing with plastic bags, prior to the walk, or tie bags to the dog leash or dog collar, or in some other awkward manner carry the bags with them. This is time-consuming, frustrating, and embarrassing. Especially if a child is assigned to walk the dog, the effort required to find and store a bag can be so tiresome that no bag is taken, thus increasing the possibility that pet excrement will not be collected.

During hot weather, exercise periods, etc, people often do not have pockets or places to store bags, as they are wearing only light clothing.

It is an aim of the invention to make it as easy as possible for the pet owner, when walking the dog, to carry a bag for excrement. It is an aim of the invention to make carrying (and of course using) the bag a logical extension of the dog-walking activity, which involves no extraordinary or unusual changes in routine.

It is an aim of the invention, and of the designs depicted herein, to provide a container for carrying recycled grocery bags on the dog'sleash, the design being such that it is easy for the dog owner to ensure that a bag is always available, and to ensure that the bags are presented for easy extraction from the container.

The invention also aims to provide a container that makes use of the inherent strength and rigidity of the leash, so that the container itself can be of light-weight material. It is also an aim that the container be integrated into the leash in a manner that is in keeping with the structural simplicity of a conventional dog leash.

1. The Prior Art

The following references might be considered relevant background to the invention: U.S. Pat. No. 5,727,500 (Conboy, March 98); U.S. Pat. No. 5,718,192 (Sebastian, February 98); U.S. Pat. No. 5,441,017 (Lindsay, August 95); EP-0,619,944 (Aerni, October 94); U.S. Pat. No. 5,363,809 (Roe, November 94); U.S. Pat. No. 5,184,762 (Nevitt, February 93).

2. General Features of the Invention

The invention lies in a dog leash assembly, comprising a dog leash and a container for recycled grocery bags, having the following preferred features.

The leash comprises a thick, narrow, elongate band of a material that is strong, heavy, and has a substantial inherent stiffness. The bag container is formed from relatively lightweight fabric material.

The lightweight material of the container is stitched into the form of a tubular enclosure, which forms the container. The container is dimensioned to a deep, narrow configuration, and the container has a wide, open mouth at a top end thereof, and the container is closed at a bottom end thereof.

The container is stitched to the leash, and is stitched at the top and bottom ends of the container, to correspondingly spaced locations on the leash, whereby the length or depth of the container is constrained by the corresponding length of the material of the leash.

Further preferred features of the invention are described below.

DETAILED DESCRIPTION OF PREFERRED EMBODIMENTS

By way of further explanation of the invention, exemplary embodiments of the invention will now be described with reference to the accompanying drawings, in which:

FIG. 4 shows the container of FIG. 3 stitched to the leash;

FIG. 5 is another view showing the container stitched to the leash;

The apparatuses shown in the accompanying drawings and described below are examples which embody the invention. It should be noted that the scope of the invention is defined by the accompanying claims, and not necessarily by specific features of exemplary embodiments.

Figure 1:
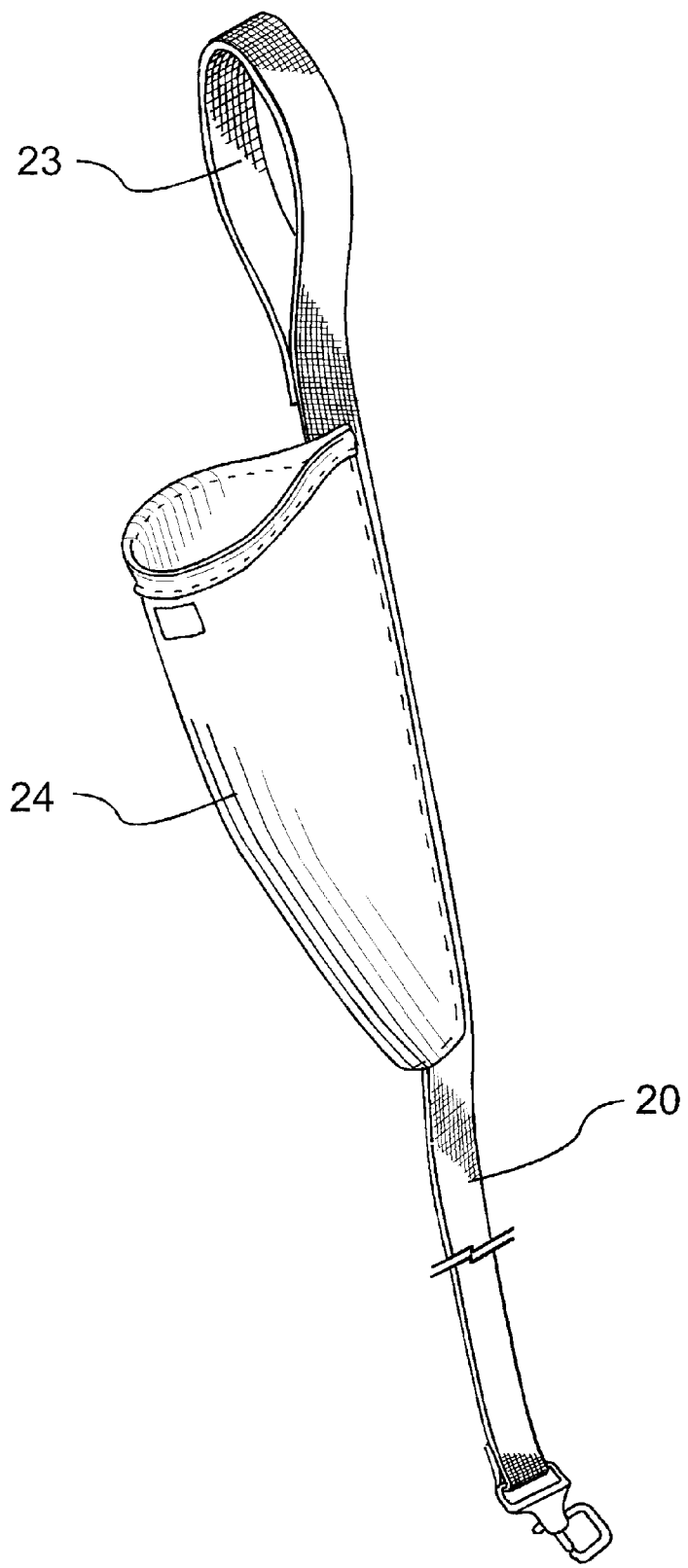
FIG. 1 is a pictorial view of a dog leash assembly, which embodies the invention.

FIG. 1 shows a dog leash 20, having a hand-loop 23. The leash is made from thick, tightly-woven nylon, or similar heavy, strong, very hard-wearing material.

Figure 2:
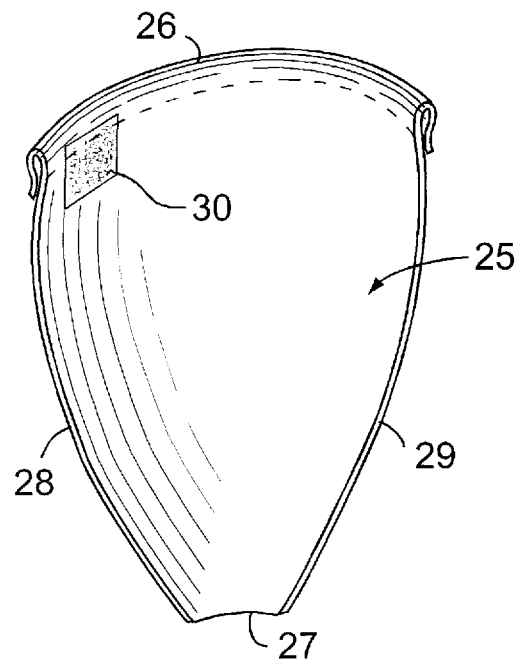
FIG. 2 is a pictorial view of a sheet or panel of nylon, as used in the manufacture of a container of the assembly of FIG. 1.

A bag container 24 is made of a material that is inherently relatively lightweight, or even flimsy. Such material has little structural rigidity; at least, not in comparison with the kind of material from which the dog leash 20 is traditionally made. The piece 25 of material (FIG. 2) has a top edge 26 (shown pre-hemmed), a bottom edge 27, and left and right side edges 28,29. A patch of Velcro(TM) 30 is stitched in place as shown.

Figure 3:
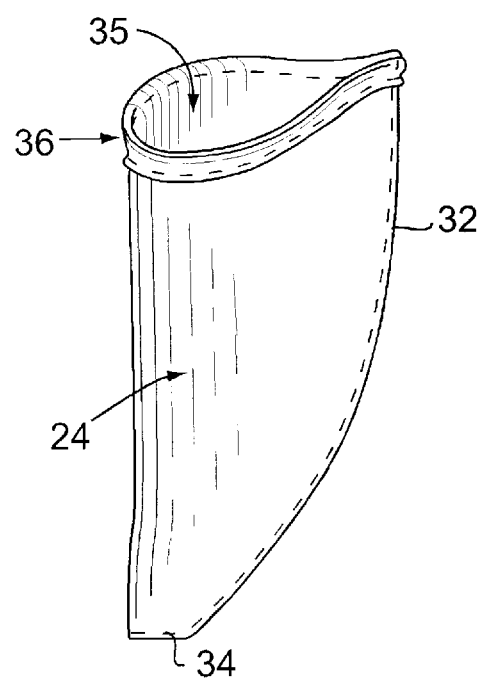
FIG. 3 shows the panel of FIG. 2 folded over and stitched to form the container.

The container itself is made conventionally, i.e by folding or wrapping the piece 25 of material around until the left and right edges 28,29 are in overlapping alignment, and then stitching (at 32) the margin of the overlap (FIG. 3). When turned inside out, the resulting form is that of a tubular enclosure.

As shown in FIG. 4, the tubular enclosure is not right-cylindrical, but rather is of a tapering configuration. That is to say, the circumference CX cm of the material of the container at a point X cm down from the top of the container decreases as X increases.

The container 24 is closed at the bottom 34 and has an open mouth 35 at the top 36.

The bag container 24 is stitched to the leash 20, being positioned thereon just under the hand loop 23 (FIG. 4). For stitching to the leash, the container 24 is folded or flattened to form a crease 37. The crease and the marginal area thereto are laid upon the leash, and stitched through, at 38.

The line of stitching 38 of the container to the leash continues across the bottom of the container, at 39. The top of the container is stitched at 40 to the leash over an area 42 (FIG. 5). The area 42 extends nearly right across the width of the leash, and is approximately square. The area 42 also corresponds in extent to a second Velcro patch 43 (FIG. 6a), which is secured by the same stitching to the leash, on the reverse side thereof to the container.

Figure 6A:
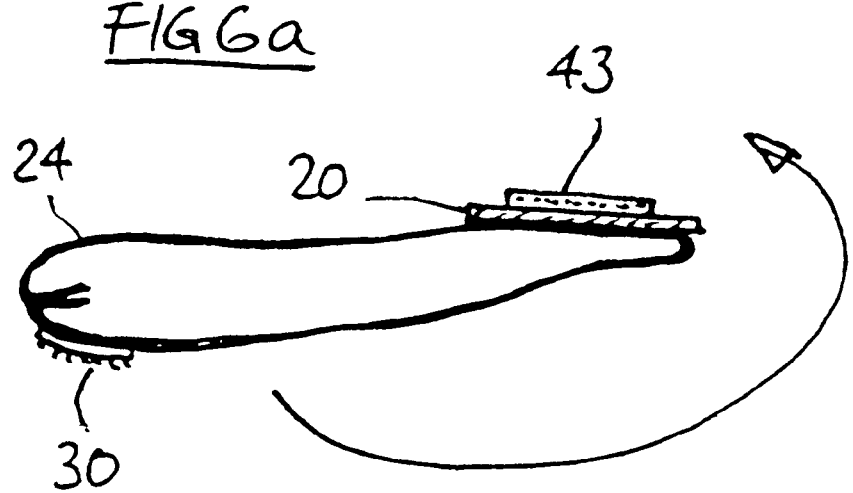
FIGS. 6a and 6b are plan views of the mouth of the container, showing the manner of wrapping and securing the mouth of the container around the leash.
Figure 6B:
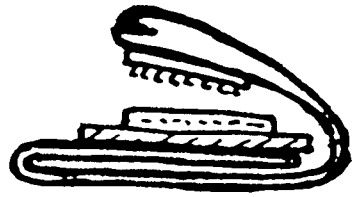

The Velcro of patch 43 is complementary to the Velcro of patch 30, whereby the two patches adhere if touched together. The patches are used to secure the open mouth 35 of the container closed, when the mouth is wrapped around the leash 20, as shown in FIGS. 6a and 6b.

The circumference CX of the container at the top, i.e the circumference C0 of the mouth at the top of the container (where X=0) is about 8". At the bottom of the container, X is approximately 10", and the container is closed. Halfway down the bag, where X=5", the container has a circumference of about 7".

In use, a plastic grocery bag (or several bags) is placed in the container 24, through the open mouth 35. The mouth 35 of the container can be closed, by wrapping the circumference C0 around the leash, and touching the patches 30,43 together.

When it is desired to make use of the bag that resides in the container (e.g to collect the dog's excrement), the user opens the mouth 35 and extracts the bag. It may be noted that at such a time, the user wishes to collect up the excrement as speedily as possible, and he or she might very well be hanging on to the dog; that is to say, hanging onto the leash, and be under some (slight) stress. That being so, the user wishes that the task of extracting a bag from the container is a task that can readily be carried out with one hand, given that the other hand is holding on to the hand-loop 23 of the leash. Thus, it is important that the container 24 be held steady at this time. If the container were to tend to crumple up, or if the mouth were to tend to become tangled in or hidden in the material of the container, that would be something of a disadvantage. The container as depicted, however, does tend to remain in a tidy, uncrumpled state, and the mouth does tend to remain easily accessible, as will now be explained.

In the design as shown, the container, though made of lightweight, flimsy material, is given some structural rigidity by being attached to the leash. When the leash is attached to the dog, the leash is held taut; even if the dog is not tugging on the leash, the leash is still held against spurious movements thereof in that the leash is constrained by extending down to the dog. Thus, when the leash is attached to the dog, the task of extracting a grocery bag from the container is easily accomplished with one hand, not least because the dog itself holds the leash steady, and in doing so holds the container steady. To some extent, the more the dog is pulling on the leash, the easier it is to extract a bag.

The task of picking up the excrement from the ground into the bag can generally be accomplished with one hand, so the user would find it quite irritating if two hands were needed for the preliminary, and incidental, task of extracting the bag.

The container 24 is comparatively deep, and of narrow opening. These qualities are desired in that the bags are well retained in the container when the container is that shape. Although the mouth of the container can be closed, in fact if the mouth is open the user need not fear that the bags will fall out. The deep depth of the container extends along the length of the leash, and it is the depth dimension of the container that is held stiff by the presence of the leash. Thus, the shape of the container is advantageous from the standpoint that the bags are held securely therein without falling out, and yet the shape is such that the bags can be easily extracted from the container in a controlled manner, with one hand.

The open mouth 35 of the container, at 8" circumference, is wide enough that a person can insert a hand therein, and the circumferences at each depth level, and the depth itself, are such that the person can extricate even a bag that has been crumpled into the bottom of the container.

The container need not be tapered equally all the way down. The container can be more or less straight at the top, and for most of the length, and then taper inwards near the bottom closure. However, the container should not be re-entrant, as that might well lead to irritating awkwardness in extracting the bags.

Sometimes the dog is not attached to the leash at the moment when the person wishes to extract a bag from the container. In that case, of course, the person has two hands free, and it is an easy matter to extract the bag through the mouth with one hand while the other hand holds the leash. Thus the container as described presents the bags for extraction whether the leash is free, or is attached to the dog, and whether the user approaches the task of extracting the bag from the container with some attention, or with complete casualness.

The task of extracting the bags is simplified by the configuration of the container as described, and by the manner of its attachment to the leash.

Similarly, the task of stuffing new bags into the container is simplified because of the configuration of the container. The user can easily see whether the container contains a bag simply by looking at the container, when the dog'sleash is hanging from its hook by the front door. Sometimes, though, the user will secure the leash to the dog, and only then decide to replenish the supply of bags in the container. At such a time, the dog is excited, and the user would not be able to perform a complex two-handed operation. With the design as described, new bags can easily be inserted into the container, with one hand, and the container secured, even though the dog might be straining at the leash.

When the container is empty, it is quite unobtrusive. The container is more or less invisible if the material of the container is the same colour as the leash. When the container is full of bags, of course the container bulges out, but even so, the appearance of the container remains in keeping with the fact that the article in question is a dog leash. A container that appeared to operate at a more sophisticated level of technology than a simple dog-leash might be incongruous. Thus, such things as flaps, pockets, buttons, zippers, and so forth, or strong, heavy, reinforced, large, or cumbersome structures, would be rather inappropriate in the container. Even though a dog leash is being provided with a container for bags, its main function continues to be that of a dog leash, and the design of the container should be consistent with that main function.

The design as depicted herein provides a long (i.e deep) container, of a relatively narrow, and tapering, configuration. That shape is advantageous from the standpoint of retaining bags therein; that is to say, the bags have little tendency to fall out. It might seem, in fact, that the relatively narrow, deep configuration of the container might cause the bags to be retained in the container rather too much; that is to say, it might seem that a user would find such a configuration perhaps awkward in that a person might find it difficult to extract a bag from the container using only one hand. This might seem especially so, since the container is made from a lightweight flimsy material that has little structural stiffness in itself.

However, it is recognised that in the design as illustrated herein, the task of keeping the container stiffened and held to shape is performed by the leash itself. The design takes advantage of the way in which a conventional leash is configured, in that the design transfers some of the leash's own structural strength and rigidity to the container. In the design as illustrated, the container is integrated into the structure of the leash. That is one of the reasons the material of the container can be lightweight and flimsy. (The term 'flimsy' is used in the sense of 'little inherent rigidity', not in the sense of 'weak'. The fabric material of the container, in the illustrated example, is woven nylon, which is amply strong enough to cope with the kind of use, and abuse, to which a dog leash is inevitably subjected.)

The dog leash assembly, with the bag container attached, can easily be stowed in the same way as a regular dog leash, both for storage at home when not in use, and for temporary storage in a hand bag or pocket for short periods while the dog is allowed to run free. The fact that a bag is present in the container makes very little difference to this manner of storage. The leash assembly, including the container, and including a bag in the container, can be crumpled or folded almost as easily as a conventional leash on its own.

The main advantages of the leash assembly as described herein may be summarised as follows.

The container being flimsy, the leash with the container attached can be crumpled and stowed in a pocket or purse, at least when the container is empty.

The container is so lightweight as to be completely unobtrusive (and invisible, if colour blended) in use of the leash, especially when empty. But even full of bags, the container is quite in keeping with the ambience of a dog leash, in the context that large cumbersome items would be out of place on a dog leash.

Opening the container for access to the bags, either to take a bag out, or to replenish the stock of bags, is easy, and is a question only of manipulating the top of the container. The rest of the container is held steady during manipulations of the mouth and top of the container, even though the material of the container is flimsy, by the fact that the container is stitched to the leash, from top to bottom.

When several bags are stored in the container, it is still easy to pull just one bag out, because the stiff leash holds the container steady while manipulations take place.

The container remains neat and tidy, whether empty or full, because it is stitched to the leash. The leash keeps the container in shape by the stiffness of the leash.

The fact that the container is only as wide as the leash at the bottom keeps the container neat and well supported on the leash. The container does not become baggy, nor does it flap and bounce about, even when fully loaded (which it might well tend to do if it were wide at the bottom).

The container gives ample storage space for several bags. The bags are disposed predominantly along the length of the leash (which is a dimension the dog leash has plenty of). Even so, the bags are concentrated at the top of the container, and accessible, because of the tapered shape of the container.

What is claimed is:

1. Dog leash apparatus, wherein:

the apparatus includes a leash, which comprises a thick, narrow, elongate band of a material that is strong, heavy, and has a substantial inherent stiffness;

the apparatus includes a bag container;

the bag container is formed from a comparatively flimsy and lightweight fabric material, the lightweight material is stitched into the form of a tubular enclosure, which forms the container;

the container is dimensioned to a deep, narrow configuration;

the container is deep in the sense that the dimension of the container as measured lengthwise relative to the leash is comparatively deep, and the container is narrow in the sense that the dimension of the container as measured laterally relative to the leash is comparatively narrow;

the leash includes a hand-loop, and the tubular enclosure that forms the container has a top end and a bottom end, and the top end thereof is the end of the tubular enclosure that lies nearer to the hand-loop;

the container has a wide, open mouth at the top end thereof, and the container is closed at the bottom end thereof;

the container is stitched at the top and bottom ends of the container, to correspondingly spaced locations on the leash, whereby the depth of the container lies along, and is constrained by, the corresponding length of the material of the leash.

2. Apparatus of claim 1, wherein the container is stitched to the leash along the full length of the container, from top to bottom thereof.

3. Apparatus of claim 1, the container being of deep, narrow configuration in that the circumference of the open mouth of the top end of the container is less than the depth of the container.

4. Apparatus of claim 1, wherein the container is stitched to the leash at a position on the leash where the open mouth at the top end of the container lies just below the hand-loop.

5. Apparatus of claim 1, wherein the container is of tapered configuration, in that the container tapers from the wide open mouth at the top end, to a width approximately equal to that of the width of the leash, at or near the bottom end of the container.

6. Apparatus of claim 1, wherein:

the container is of the deep, narrow configuration in that, in that configuration, the material of the tubular enclosure defines a cross-sectional circumference CX cm of the container, being the circumference of the tubular enclosure at a distance X cm down the container from the top end thereof;

at the top end of the container, where X is zero, the tubular enclosure has an open cross-sectional circumference C0 that forms an open mouth;

at the bottom end of the container, where X is a maximum, the tubular enclosure is closed;

intermediate between the top and bottom ends of the container, the tubular enclosure is of tapering form, i.e the circumference CX gets smaller as X gets larger.

7. Apparatus of claim 1, including an operable means for fastening the mouth of the container closed.

8. Apparatus of claim 1, wherein the operable means includes a means for retaining the circumference of the container at the top end thereof in a flattened configuration, the material that defines the circumference being wrapped around the leash.

* * * * *